Dec. 5, 1944.  P. A. ANDERSON  2,364,119
OIL TANK FOR AIRPLANE ENGINES
Filed Feb. 26, 1943  2 Sheets-Sheet 1
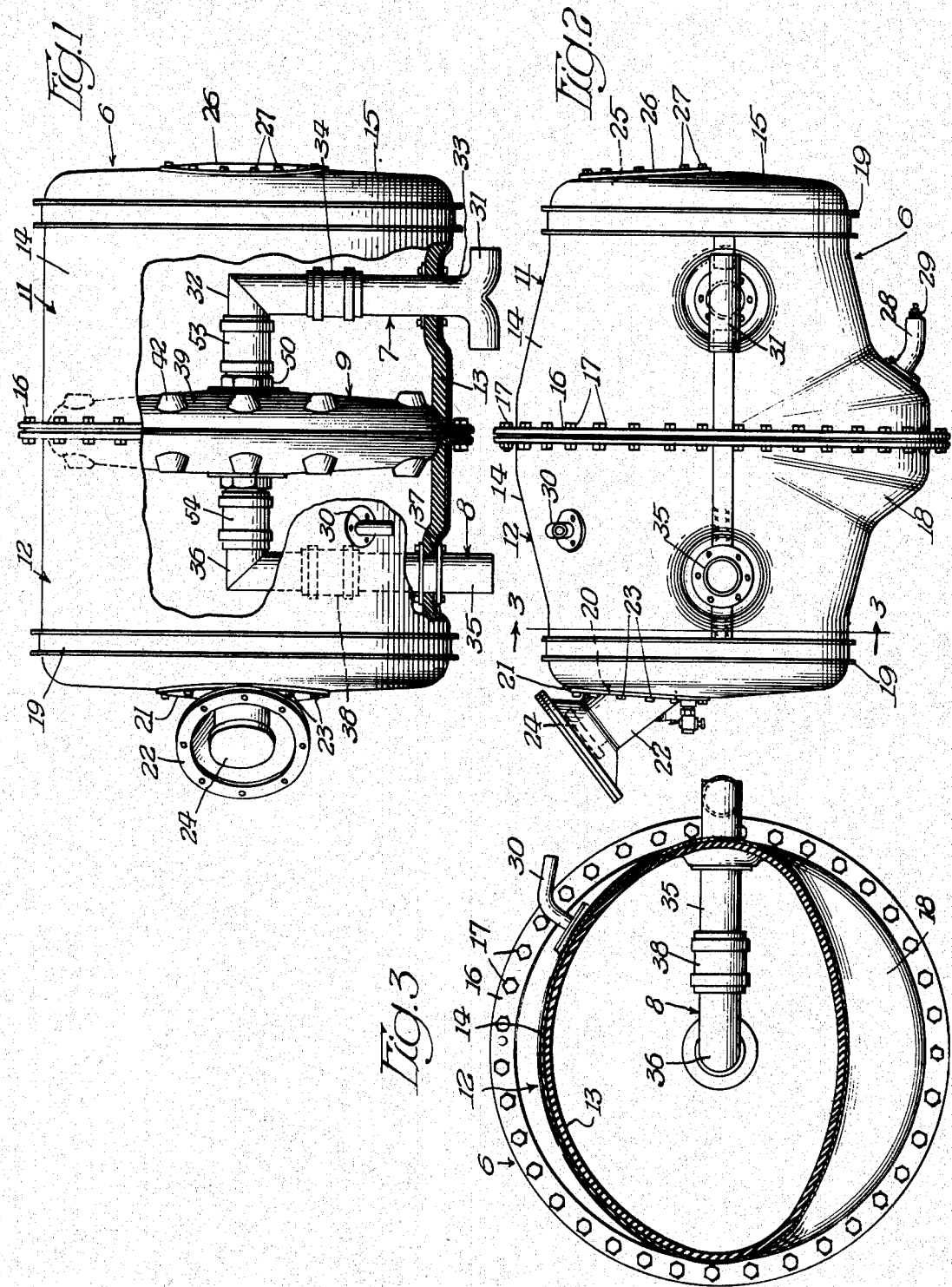
Inventor
Paul A. Anderson
By Thed Gerlach Atty.

Dec. 5, 1944.    P. A. ANDERSON    2,364,119
OIL TANK FOR AIRPLANE ENGINES
Filed Feb. 26, 1943    2 Sheets-Sheet 2
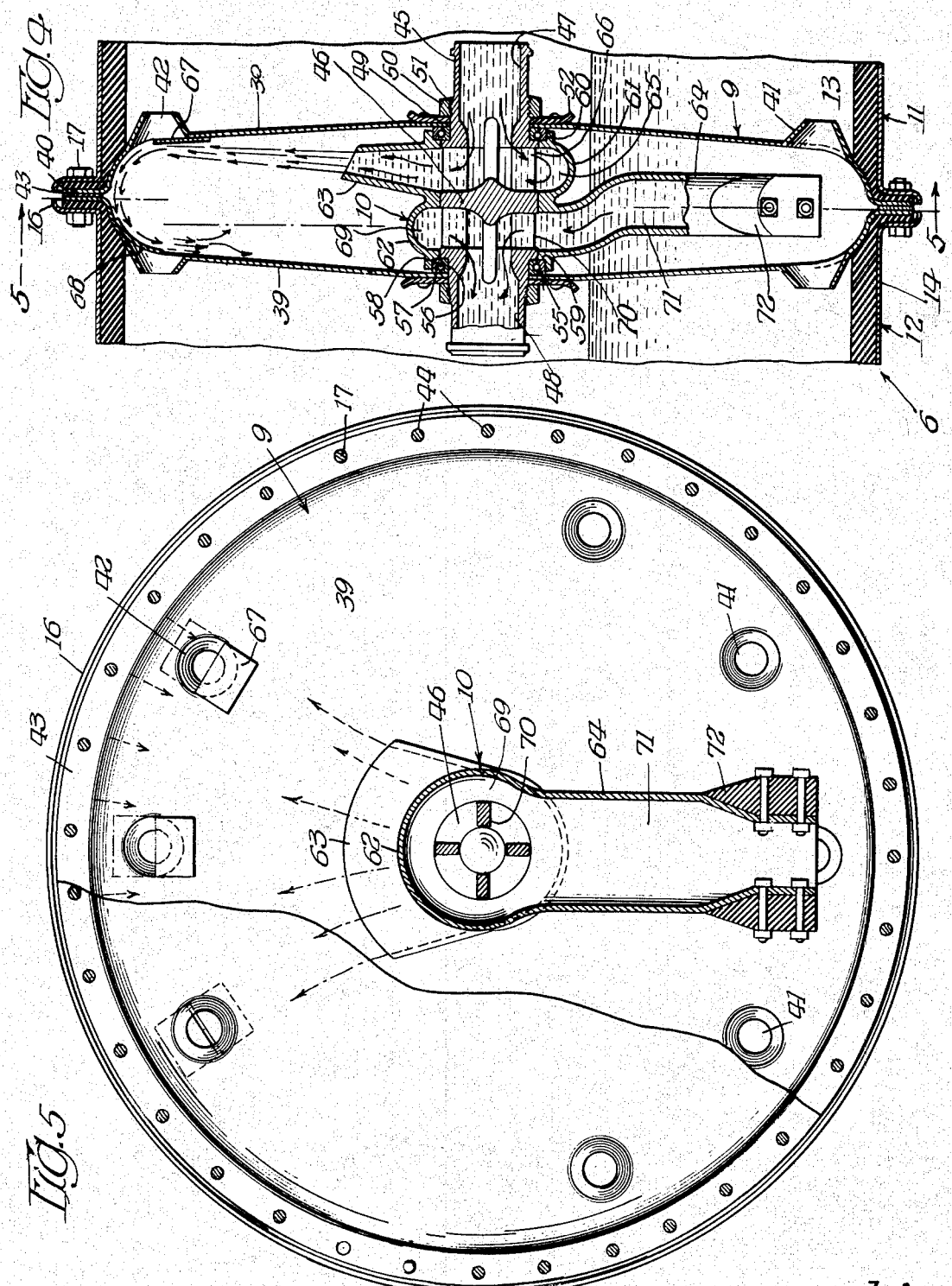
Inventor
Paul A. Anderson
By Fred Gerlach
Atty.

Patented Dec. 5, 1944

2,364,119

UNITED STATES PATENT OFFICE 2,364,119

OIL TANK FOR AIRPLANE ENGINES

Paul A. Anderson, Monrovia, Calif., assignor, by mesne assignments, to Consolidated Vultee Aircraft Corporation, a corporation of Delaware Application February 26, 1943, Serial No. 477,325

3 Claims. (Cl. 183—2.5)

The present invention relates generally to oil tanks. More particularly the invention relates to that type of tank which is designed for use in connection with, and to form a part of, an oil circulating system for the propeller driving internal combustion engine of an airplane, serves as a retaining and supply medium for a body of oil, and embodies in addition to a return pipe leading to it from the engine and a supply pipe leading from it to the engine, means for establishing communication between the inlet end of the supply pipe and the bottom portion of the body of oil in the tank, regardless of the flight attitude of the airplane to the end that at all times there will be an uninterrupted flow of oil to the engine and engine failure or damage due to cessation of oil circulation will thus be obviated.

One object of the invention is to provide an airplane engine oil tank which is an improvement upon, and has certain advantages over, previously devised tanks for the same purpose and is characterized by a novel arrangement of parts and exceptionally high efficiency of operation.

Another object of the invention is to provide an oil tank of the aforementioned type embodying in the central part thereof a transversely extending hopper which has the discharge end of the return pipe and the inlet end of the supply pipe communicating therewith, is provided with holes therein for permitting oil to flow into it from the body of oil in the tank, and serves as a quick warm-up chamber for the oil that is in circulation within the system with which the tank is associated.

Another object of the invention is to provide an airplane engine oil tank of the type and character last mentioned in which the means for establishing communication between the inlet end of the supply pipe and the bottom portion of the body of oil is disposed or located in the hopper and is in the form of a rotatable unit which is positioned in coaxial relation with the discharge end of the return pipe and the inlet end of the supply pipe, has a downwardly extending duct with the lower end open and in communication with the hopper bottom and its upper end open and communicating with the inlet end of the supply pipe, and is weighted or balanced so that when the airplane tilts downwards in connection with a dive or upwards in connection with climbing it rotates relatively to the hopper and other parts of the tank and thus maintains the duct in a substantially vertical position.

A further object of the invention is to provide an oil tank of the last mentioned character in which the rotatable unit constituting the means for establishing communication between the inlet end of the supply pipe and the bottom portion of the body of oil in the tank includes an upwardly extending nozzle which is in communication with, and is adapted to receive oil under pressure from, the discharge end of the return pipe and serves to jet the oil upwards in a fanlike stream, thus assisting in separation from the oil of any air which is trapped therein.

A still further object of the invention is to provide an airplane engine oil tank which is generally of new and improved construction and is so designed that its various component parts may be assembled and dismantled with facility.

Other objects of the invention and the various advantages and characteristics of the present airplane engine oil tank will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a plan view of an airplane engine oil tank embodying the invention, certain parts being broken away and other parts being shown in section in order to show or illustrate the manner in which the hopper is mounted in the tank;

Figure 2 is a side view of the tank;

Figure 3 is a vertical transverse section on the line 3—3 of Figure 2;

Figure 4 is an enlarged longitudinal section of the central portion of the tank, illustrating the construction of the hopper and showing in detail the design and arrangement of the rotatable unit which embodies the downwardly extending duct for supplying oil from the hopper bottom to the inlet end of the supply pipe and the upwardly extending nozzle which is in communication with, and is adapted to receive oil under pressure from, the discharge end of the return pipe and serves to jet the oil upwards in a fan-like stream toward the upper portion of the hopper; and Figure 5 is a vertical transverse section taken on the line 5—5 of Figure 4 and illustrating the manner in which the rotatable unit is weighted so that when the airplane tilts downwards or upwards in connection with a flight maneuver it rotates relatively to the hopper and other parts of the tank and thus maintains the duct in a substantially vertical position.

The tank which is shown in the drawings constitutes the preferred form or embodiment of the invention. It is designed for use in connection with, and to form a part of, an oil circulating system for an airplane engine (not shown). It is contemplated that the tank will be mounted transversely of the line of flight or longitudinal axis of the airplane with which it is associated. As its parts the tank comprises a substantially cylindrical shell 6, a return pipe 7, a supply pipe 8, a hopper 9 and a rotatable unit 10.

The shell 6 is adapted to hold or retain a body of oil therein and is of sectional design. It consists of a pair of complemental, opposed, cup shaped sections 11 and 12 and is preferably provided with a liner 13 of so-called self-healing material in order to prevent oil leakage in the event that the tank is penetrated or punctured by a bullet or other projectile. The sections 11 and 12 of the shell 6 are formed of sheet metal or any other suitable material and comprise continuous side walls 14 and outer end walls 15. The inner ends of the side walls 14 embody outwardly extending annular flanges 16 and are secured together by way of clamp bolts 17 which extend through the flanges. The lower inner portions of the side walls 14 of the two shell sections are downwardly deformed to form a sump 18 at the lower central portion of the shell 6. The end walls 15 of the sections 11 and 12 extend across, and serve to close, the outer ends of the side walls 14. Continuous bands 19 of channel shaped cross section extend around the outer ends of the side walls 14 of the two sections 11 and 12 and serve to reenforce the shell. The upper portion of the end wall of the section 12 is provided with a circular opening 20 and this is normally closed by way of a plate 21 having a filler neck 22 on the central portion thereof. Bolts 23 extend through the marginal portion of the plate 21 and the opening defining portion of the end wall of the shell section 12 and serve removably to hold the plate in its operative position. The filler neck 22 serves as a medium for introducing oil into the tank and has a removable closure cap 24 at its outer end. The upper portion of the end wall of the shell section 11 is provided with an access opening 25 and this is normally closed by way of a plate 26 which is removably secured in place by way of bolts 27 which extend through the margin of the plate 26 and the opening defining portion of the end wall of the section 11. A drain pipe 28 is connected to, and leads from, the sump 18 and permits the tank to be drained when desired. This drain pipe communicates with the interior of the sump and is provided with a screw plug 29 for closing it. The upper portion of the shell 6 is vented by way of a vent pipe 30 which is secured to the upper inner portion of the side wall of the section 12.

The return pipe 7 leads from the engine of the airplane with which the tank is associated and is adapted to receive oil under pressure from the engine. It normally extends horizontally, and consists of a T 31 and an elbow 32. The end branches of the T are disposed exteriorly of the shell and are connected to the airplane engine by piping or tubing (not shown). The intermediate branch of the T 31 extends through a hole 33 in the front portion of the side wall of the shell section 11 and has the inner end thereof connected to one branch of the elbow 32 by way of a hose type coupling 34. The hole 33 is suitably sealed so as to prevent leakage of oil therethrough. The other branch of the elbow 32 extends inwards, as shown in Figure 1.

The supply pipe 8 serves to supply oil from the tank to the engine, and is normally positioned horizontally. It is horizontally aligned with the return pipe 7 and consists of a straight pipe section 35 and an elbow 36. The straight pipe section 35 extends through a hole 37 in the front portion of the side wall of the shell section 12 and has suitable sealing means associated therewith in order to prevent leakage of oil through the hole 37. The outer end of the pipe section 35 is connected by suitable piping or tubing (not shown) to the inlet side of a pump (also not shown) for forcing oil under pressure through the engine. The inner end of the pipe section 35 of the supply pipe 8 is connected by way of a hose type coupling 38 to one branch of the elbow 36. The other branch of the elbow extends inwards and is axially aligned with the inwardly extending branch of the elbow 32 of the return pipe 7.

The hopper 9 serves, as hereinafter described, as a quick warm-up chamber for the oil that is in circulation in the system and is disposed in the central portion of the tank shell 6. It extends transversely of the shell, and consists of a pair of circular, spaced apart plates 39. These plates are outwardly bulged or dished and embody flat parallel annular flanges 40 on the outer marginal portions thereof. They are disposed between the inwardly extending branches of the elbows 32 and 36 and have oil inlet holes 41 in the lower portions thereof and vent holes 42 in their upper portions. The flanges 40 and the outer marginal portions of the plates 39 are separated by a ring shaped gasket 43. They fit between the outwardly extending flanges 16 at the inner ends of the side walls 14 of the shell sections 11 and 12 and have aligned pairs of holes 44 therein. The clamp bolts 17 extend through these holes and serve releasably to hold the flanges 40 and 16 and the gasket 43 in clamped relation. When the bolts 17 are removed the sections 11 and 12 of the shell 6 may be separated in order to provide access to the hopper 9. The holes 41 in the lower portions of the hopper 9 permit oil to flow into the hopper interior from the interior of the shell 6. The vent holes 42 in the upper portions of the plates 39 serve to vent the hopper 9.

The unit 10 is disposed or located in the hopper 9 and serves as a means or medium for establishing communication between the inlet end of the supply pipe 8 and the bottom portion of the hopper, regardless of the position which the airplane may assume in connection with dive or climb. It is preferably in the form of a one-piece metal casting and is mounted for rotation about a tubular element 45. This element is also preferably in the form of a casting and is disposed in parallel relation with the longitudinal axis of the shell 6 of the tank. It embodies a centrally disposed cross wall 46 and has a longitudinal passage 47 in the end thereof that projects towards the elbow 32 and a longitudinal passage 48 in the end thereof that projects towards the elbow 36 of the supply pipe 8. The ends of the tubular element 45 extend through circular holes 49 in the central portions of the hopper plates 39 and project into the interiors of the shell sections 11 and 12. The element 45 is held against axial displacement relatively to the hopper 9 by way of a pair of nuts 50. These nuts are disposed outwards of the hopper plates 39 and are mounted on external screw threads 51 on the ends of the element 45. Gaskets 52 are interposed between the nuts and the hole defining portions of the hopper plates 39 and serve to prevent oil from leaking through the holes 49. The end of the element 45 that embodies the passage 47, that is, the end that projects into the interior of the shell section 11, is connected to the inwardly extending branch of the elbow 32 of the return pipe 7 by way of a hose type coupling 53. The other end of the element 45, that is, the end with the passage 48, is connected to the inwardly extending branch of the elbow 36 by way of a hose type coupling 54. The element 45 is held in fixed relation with the hopper 9 by the nuts 50 and the couplings 53 and 54. The unit 10 surrounds the central portion of the tubular element 45 and is journalled for rotation relatively thereto by way of a pair of ball bearings 55. These bearings are located directly inwards of the portions of the hopper plates 39 that define the central holes 49 and consist of inner races 56, outer races 57 and balls 58 between the inner and outer races. The inner races 56 surround the end portions of the element 45 and abut against outwardly facing shoulders 59 on the element. The nuts 50 serve to clamp the inner races of the ball bearings 55 against the shoulders. The outer races 57 of the ball bearings 55 fit within annular grooves 60 in the ends of the unit 10. This unit comprises a pair of side by side annular, outwardly bulged walls 61 and 62, an upwardly extending fan shaped nozzle 63 and a downwardly extending arm 64. The wall 61 surrounds that portion of the tubular element 45 that has the inner end of the passage 47 and defines a ring-shaped chamber 65. The latter communicates with the inner end of the passage 47 by way of an annular series of radially extending slots 66 in the element 45. The nozzle 63 is connected to, and projects upwards from, the upper portion of the wall 61 and has the upper end thereof in communication with the upper portion of the chamber 65. When the oil circulating system with which the tank is associated is in operation oil under pressure flows through the return pipe 7 and is discharged into the passage 47. From the passage 47 the oil flows outwards through the slots 66 into the chamber 65 and then passes upwards through the nozzle 63. The latter serves to jet the oil towards the upper portion of the hopper 9 and causes the oil to assume a thin fan shaped stream in order to assist in separation or elimination of any air that is trapped therein. As shown in Figure 4, the nozzle 63 is tilted in the direction of the hopper plate that faces the shell section 11. As a result of the inclination or angularity of the nozzle 63 the oil which is jetted from the nozzle in the form of a fan shaped stream flows upwards towards the upper portion of said hopper plate and then flows downwards along the upper portion of the other hopper plate (see arrows in Figure 4). Baffles 67 are positioned adjacent the vent holes 62 in the upper portion of the hopper plate that faces in the direction of the shell section 11 and these serve to prevent the oil that is jetted upwards from the nozzle 63 from passing through such vent holes. Baffles 68 are associated with the vent holes in the other hopper plate, that is, the hopper plate that faces the shell section 12, and prevents the jetted oil from flowing through such holes as it passes downwards thereby. The wall 62 of the unit 10 surrounds that portion of the tubular element 45 that has the inner end of the passage 48 and defines a ring shaped chamber 69. This chamber communicates with the inner end of the passage 48 by way of an annular series of radially extending slots 70 in the element 45. The inner portions of the annular, outwardly bulged walls 61 and 62 of the unit 10 surround the cross wall 46 of the element 45 and thus serve to separate or maintain independent the chambers 65 and 69. The arm 64 is connected to, and projects downwards from, the lower portion of the wall 62. It is of tubular design and has a duct 71 extending longitudinally therethrough. The lower end of the arm 64 is open and terminates adjacent the bottom portion of the hopper 9. The upper portion of the duct 71 communicates with the lower portion of the ring shaped chamber 69. When the oil circulating system with which the tank is associated is in operation oil in the bottom portion of the hopper is drawn upwards through the duct 71, then flows from the chamber 69 through the slots 70 into the inner end of the passage 48, and then flows through this passage and the supply pipe 8 back to the suction side of the oil pump. Weights 72 are bolted or otherwise fixedly secured to the lower end of the arm 64 and serve to maintain the downwardly extending position of the arm, regardless of any downward or upward tilting of the airplane in connection with dive or climb thereof. When the airplane is tilted downwards in connection with a dive maneuver the weights 72 cause the unit 10 to rotate relatively to the hopper and thus maintain the arm 64 so that the lower or inlet end thereof is adjacent the bottom portion of the hopper. When the airplane is tilted upwards in connection with a climb maneuver the weights cause the unit to rotate reversely relatively to the hopper with the result that the duct 70 is maintained substantially vertical and the inlet end thereof is in communication with the bottom portion of the hopper. Preferably there are two weights 72 and these are disposed on opposite sides of the lower end of the arm 64. In the event that the airplane is tilted sidewise, that is, rolled about its longitudinal axis in connection with a flight maneuver, there is no interruption in the drawing of oil through the supply pipe 8 because of trapping of oil in the sump 18 adjacent the lower portion of the hopper. The inlet holes 41 in the lower portions of the hopper plates 39 permit oil to flow into the lower portion of the hopper from the sump.

The operation of the tank is as follows:

When the pump for the circulating system with which the tank is associated is in operation oil is supplied to the engine from the hopper 9 via the supply pipe 8 and is returned under pressure to the hopper by way of the return pipe 7. As heretofore pointed out, the oil under pressure returning to the hopper via the return pipe flows into the passage 47 after traversing the return pipe 7, then flows outwards through the annular series of radially extending slots 66 into the ring shaped chamber 61 and then flows upwards through the nozzle 63 and is jetted in the form of a fan shaped stream to the upper portion of the hopper. From the upper portion of the hopper the oil drops downwards into the lower portion of the hopper. During up and down flow of the oil in the upper portion of the hopper any air which is trapped in the oil is released. From the lower portion of the hopper, the oil is drawn upwards through the duct 71 and then flows into the passage 48 via the slot 70 and the ring shaped chamber 68. From the passage 48 the oil is drawn through the supply pipe 8 and then passes to the pump of the circulating system. The hopper, although it is in communication with the interior of the shell 6 serves to isolate the oil in it from the body of the oil in the shell and since it is of limited capacity or size it forms a quick warm-up chamber for the oil when the engine with which the tank is employed is started during cold weather. In other words the oil which is returned to the tank via the return pipe, instead of mixing with the body of oil in the shell, flows through the small sized hopper and thence back to the engine and in this way is quickly warmed in connection with starting of the engine. The oil in the hopper is maintained at the same level as the oil in the shell because of the inlet holes 41 in the lower portion of the hopper sides 39. When the airplane tilts downwards or upwards in connection with a flight maneuver the unit 10, because it is weighted or balanced and also rotatable relatively to the hopper, remains in a position wherein the arm 64 is substantially vertical and hence there is an uninterrupted flow of oil from the bottom portion of the hopper through the duct 71 in the arm and the supply pipe 8. The tank is filled or loaded by delivering oil into it via the filler neck 22. If it is desired to drain the tank the plug 29 is removed so as to open the drain pipe 28. In the event that it is desired to inspect, repair or replace the hopper 9 and the rotatable unit 10 it is only necessary to remove the clamp bolts 17 and separate the shell sections 11 and 12.

The herein described tank effectively and efficiently fulfills its purpose and involves a novel and improved arrangement of parts. By reason of the fact that the rotatable element 10 includes the downwardly extending duct equipped arm 64 there is always an uninterrupted flow of oil through the supply pipe 8, regardless of the degree of downward or upward tilt of the airplane. By providing the rotatable unit 10 with the upwardly extending nozzle 63 the oil, prior to being drawn through the duct 71 and the supply pipe 8, is so jetted or sheeted out that any air bubbles that are entrained therein are permitted effectively to separate from the oil. By locating the unit 10 in the hopper 9 the hopper serves as a quick warm-up chamber for the oil.

Whereas the tank has been described as forming a part of an oil circulating system for the engine of an airplane it is to be understood that it has many other capabilities of use and may be employed as a retaining and supply medium for a liquid other than oil. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. A tank designed for use in connection with a liquid circulating system and comprising a shell adapted to hold a body of the liquid, an elongated element disposed in a horizontal position within the central portion of the shell and having an inlet passage at one end thereof, an outlet passage at its other end, and a crosswall between the two passages, a return pipe extending into the shell and having the discharge end thereof connected to said one end of the element and in communication with the inlet passage, a supply pipe leading from the shell and having the inlet end thereof connected to said other end of the element and in communication with the outlet passage, and a unit mounted to rotate about the element, embodying an upstanding nozzle in communication with the inlet passage, and a depending arm having a longitudinal passage therein with the lower end thereof in communication with the bottom portion of the shell interior and its upper end in communication with the outlet passage, and so weighted that it is caused to assume its normal position in the event that the shell is tilted or angularly displaced relatively to the axis of rotation of the unit.

2. A tank designed for use in connection with a liquid circulating system and comprising a shell adapted to hold a body of the liquid, an upstanding hopper disposed in the shell and having means for permitting liquid to flow into it from said shell, an elongated horizontally extending element extending through, and fixedly secured to, the central portion of the hopper and having an inlet passage in one end thereof, an outlet passage in its other end, and a crosswall between the two passages, a return pipe extending into the shell and having the discharge end thereof connected to said one end of the element and in communication with the inlet passage, a supply pipe leading from the shell and having the inlet end thereof connected to said other end of the element and in communication with the outlet passage, and a unit mounted in the hopper so that it is rotatable about the element, embodying an upstanding nozzle in communication with the inlet passage, and a depending duct with the lower end thereof in communication with the lower portion of the hopper interior and its upper end in communication with the outlet passage, and so weighted that it assumes its normal position when the shell and hopper are tilted or angularly displaced about the axis of rotation of the unit.

3. A tank designed for use in connection with a liquid circulating system and comprising a horizontally elongated shell adapted to hold a body of the liquid and consisting of a pair of complemental opposed cup-shaped sections having the free margins of the side walls thereof disposed adjacent one another and provided with continuous out-turned flanges, a hopper disposed within, and extending transversely across, the central portion of the shell, consisting of a pair of opposed outwardly bulged plates with continuous marginal flanges arranged in interposed relation with the out-turned flanges of the shell sections, and having holes in the lower portions of its plates for permitting liquid to flow into it from the shell, releasable means for holding the various flanges in clamped relation, an elongated horizontally extending element extending through, and fixedly connected to, the central portions of the hopper plates and having an inlet passage in one end thereof, an outlet passage in its outer end, and a crosswall between the two passages, a return pipe extending into one of the shell sections and having the discharge end thereof connected to said one end of the element and in communication with the inlet passage, a supply pipe leading through the other shell section and having the inlet end thereof connected to said other end of the element and communicating with the outlet passage, and a unit mounted in the hopper so that it is rotatable about the element, embodying an upstanding nozzle in communication with the inlet passage, and a depending duct with the lower end thereof in communication with the lower portion of the hopper interior and its upper end in communication with the outlet passage, and so weighted that it assumes its normal position when the shell and hopper are tilted or angularly displaced about the axis of rotation of the unit.

PAUL A. ANDERSON.